United States Patent [19]

Brecher

[11] Patent Number: 4,661,975
[45] Date of Patent: Apr. 28, 1987

[54] ENHANCED CALL-WAITING SERVICE

[75] Inventor: Sergio M. Brecher, Tenafly, N.J.

[73] Assignee: Bell Communications Research, Inc., Livingston, N.J.

[21] Appl. No.: 711,471

[22] Filed: Mar. 13, 1985

[51] Int. Cl.$^4$ ............................................. H04M 3/42
[52] U.S. Cl. ...................................... 379/215; 379/361
[58] Field of Search ........... 179/18 BG, 18 BH, 18 B, 179/84 C, 84 VF, 27 FD, 18 BC

[56] References Cited

U.S. PATENT DOCUMENTS

| | | | |
|---|---|---|---|
| 3,854,014 | 12/1974 | Akin et al. ...................... | 179/18 BG |
| 4,022,983 | 5/1977 | Braun et al. ......................... | 179/18 |
| 4,232,199 | 11/1980 | Boatwright et al. .............. | 179/18 B |
| 4,277,649 | 7/1981 | Sheinbein .......................... | 179/18 B |
| 4,278,844 | 7/1981 | Jones ................................. | 179/18 B |
| 4,320,258 | 3/1982 | McDonald ....................... | 179/18 B |

Primary Examiner—James L. Dwyer
Attorney, Agent, or Firm—James W. Falk; Howard R. Popper

[57] ABSTRACT

A process for controlling a telephone switching system is disclosed which gives a telephone customer alternative ways of handling an incoming call while that customer is engaged with an existing call. The conventional call-waiting process is modified by permitting the dual tone multifrequency buttons to be operated for a predetermined short interval after the call-waiting signal is given to the called customer responsive to the particular tone signals keyed. The switching system is enabled to send busy tone or a predetermined announcement to the calling party or to reroute the calling party to an alternate destination.

6 Claims, 5 Drawing Figures

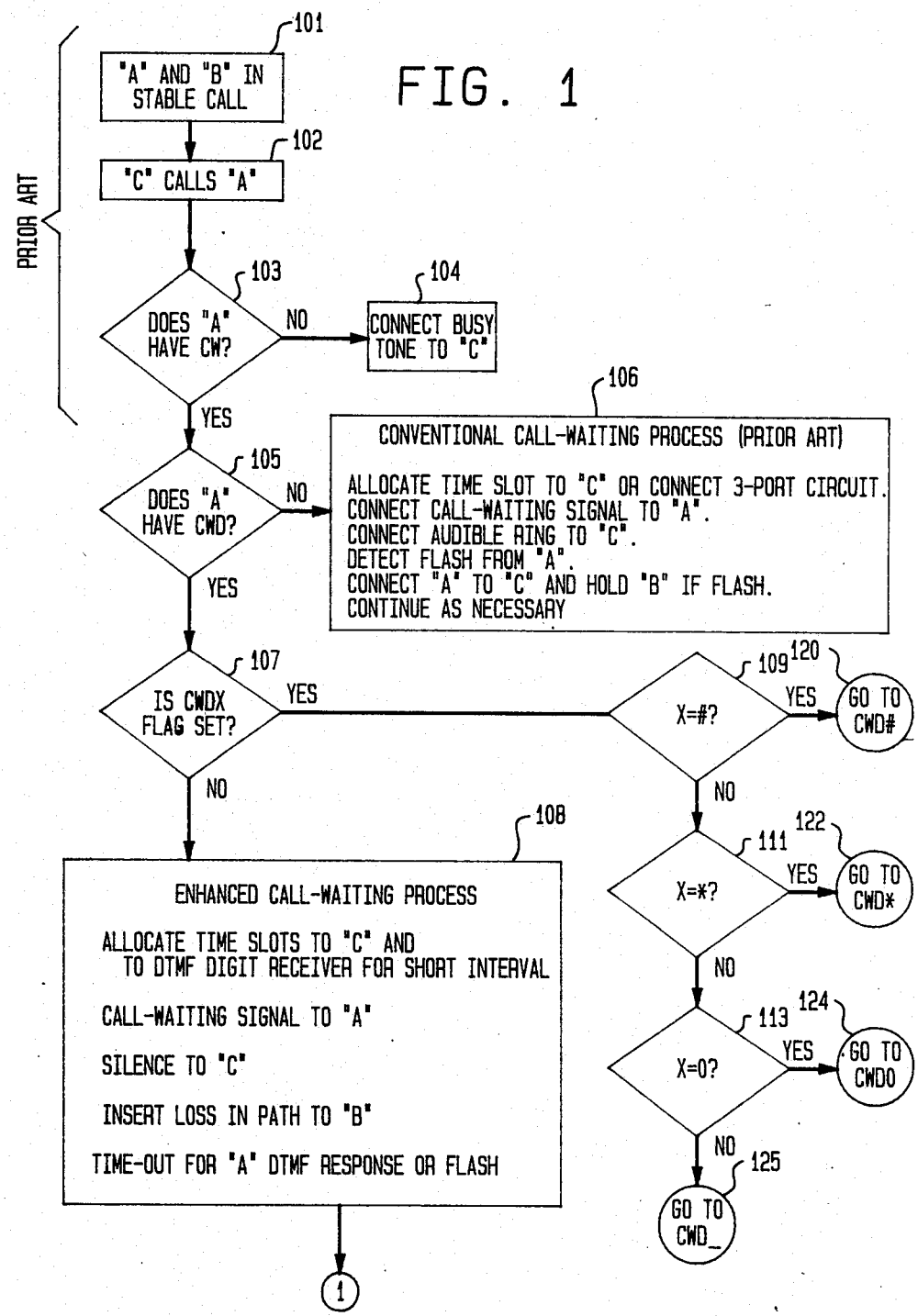

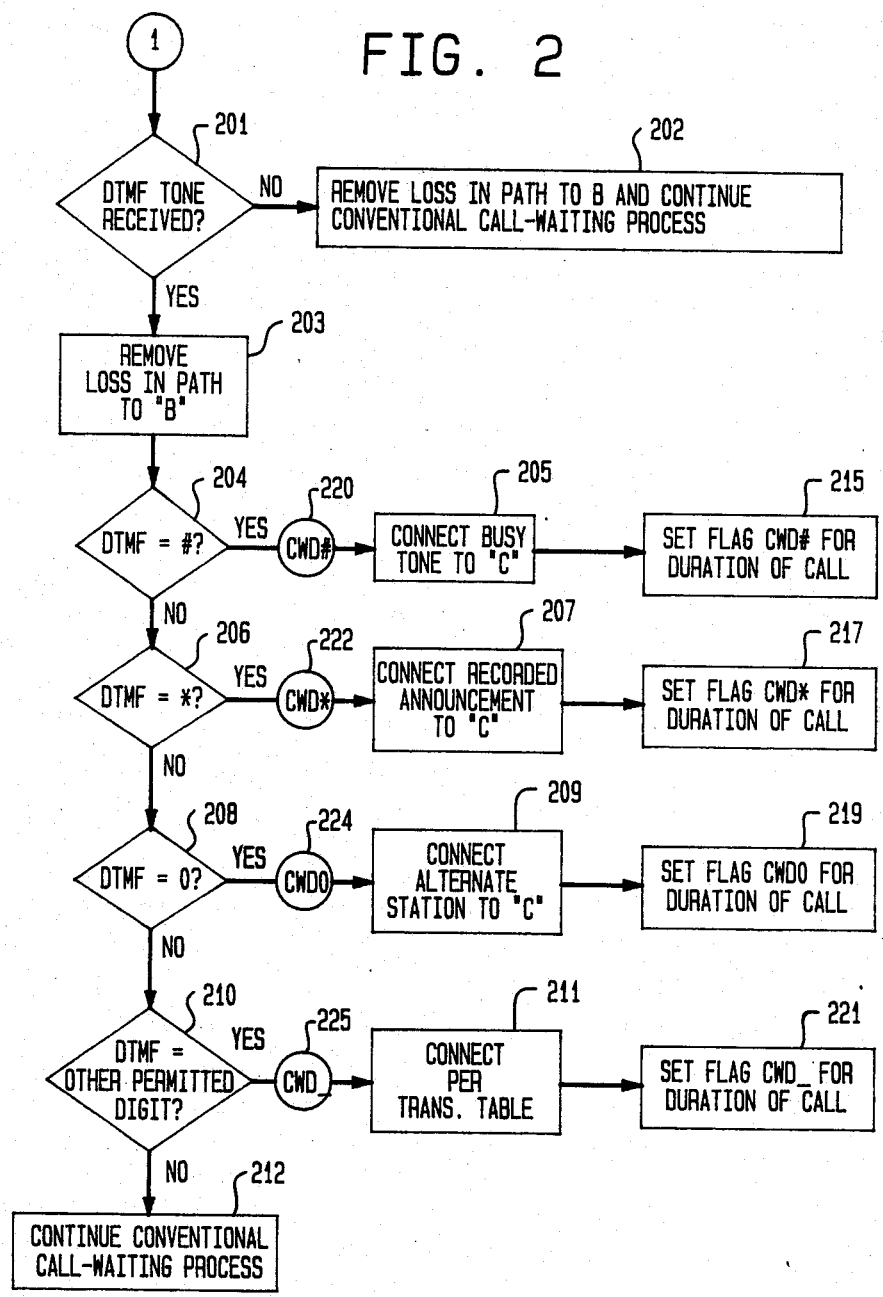

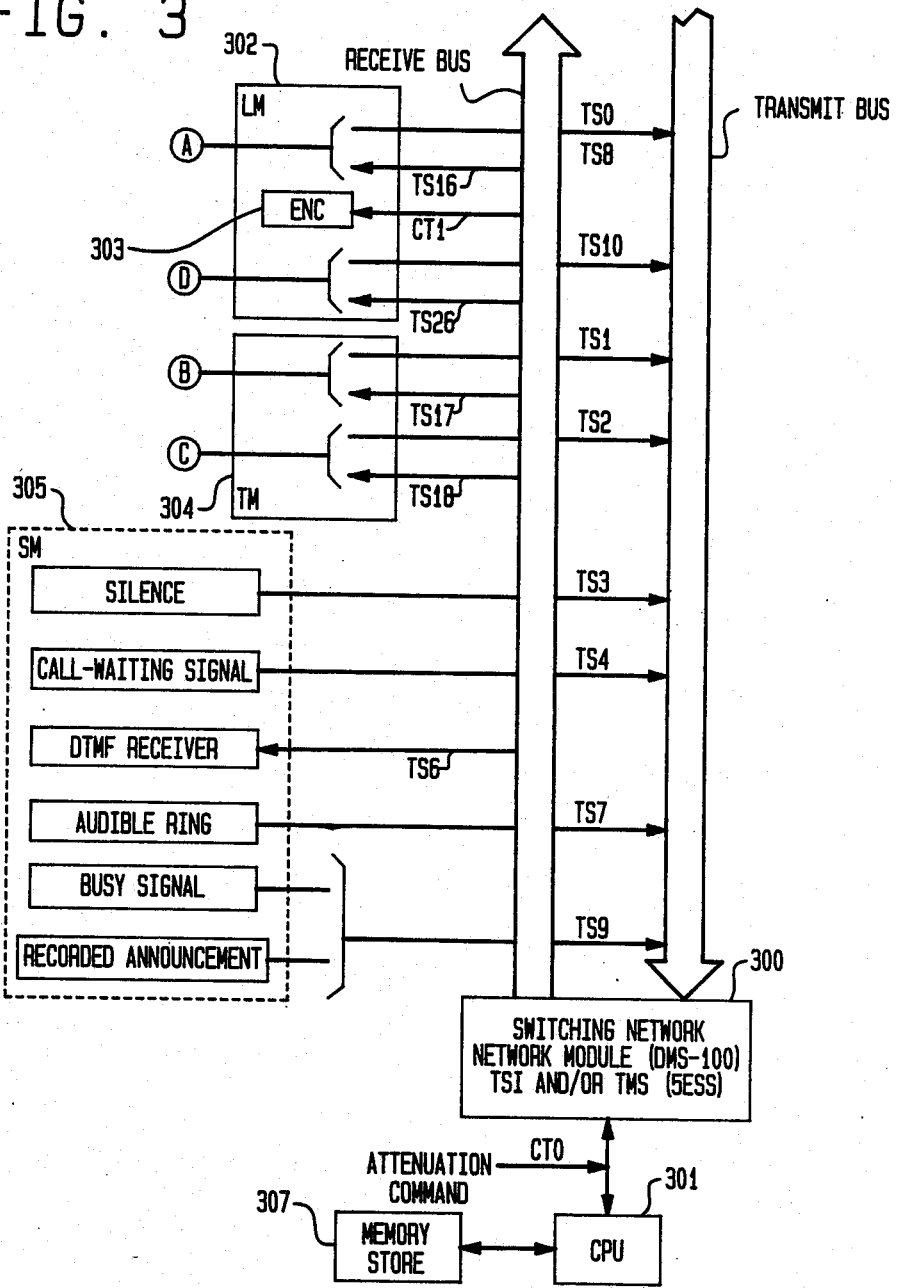

FIG. 4

| APPEARANCE/FUNCTION | EVENTS | | | | | |
|---|---|---|---|---|---|---|
| | E1 | E2 | E3 "SHORT INTERVAL" | E4 | E5 | E6 |
| | A TALKS TO B | A TALKS TO B C CALLS A CWT TO A | A TALKS TO B A DIALS SPECIFIC DTMF DIGIT | A TALKS TO B BUSY TONE TO C | A TALKS TO B C GOES ON HOOK | A AND B ON HOOK |
| STATION A | TS0 (FROM A) TS16 (TO A) | TS0 (FROM A) TS16 (TO A) | TS0 (FROM A) TS16 (TO A) TS8 (TO DTMF RCV) | TS0 (FROM A) TS16 (TO A) | TS0 (FROM A) TS16 (TO A) | A ON HOOK |
| STATION B | TS1 (FROM B) TS17 (TO B) | TS1 (FROM B) TS17 (TO B) | TS1 (FROM B) TS17 (TO B) | TS1 (FROM B) TS17 (TO B) | TS1 (FROM B) TS17 (TO B) | B ON HOOK |
| STATION C | | TS2 (FROM C) TS18 (TO C) (SILENCE TO C) | TS2 (FROM C) TS18 (TO C) (SILENCE TO C) | TS2 (FROM C) TS18 (TO C) (BUSY TO C) | C ON HOOK | |
| SILENCE | | TS3 (TO C VIA TS18) | TS3 (TO C VIA TS18) | | | |
| CALL-WAITING SIGNAL | | TS4 OR SWITCHING NETWORK (TO A) | | | | |
| DTMF RECEIVER | | | TS6 OR SWITCHING NETWORK (TO DTMF RCV) | | | |
| ATTENUATION | | | FROM A TO B TO REDUCE ANNOYANCE | | | |
| BUSY OR OTHER TERMINATION TREATMENT | | | | TS9 BUSY TO C | | |
| AUDIBLE RING | | | | | | |

FIG. 5

EVENTS

| APPEARANCE/FUNCTION | E1<br>A TALKS TO B | E2<br>A TALKS TO B<br>C CALLS A<br>CW SIGNAL TO A | E7 "SHORT INTERVAL"<br>A TALKS TO B<br>A DOES NOT<br>ACTIVATE CMD | E8<br>CMD ACTIVATION<br>TIME-OUT | E9<br>CONVENTIONAL<br>TREATMENT TO A, B, AND C |
|---|---|---|---|---|---|
| STATION A | TS0 (FROM A)<br>TS16 (TO A) | TS0 (FROM A)<br>TS16 (TO A) | TS0 (FROM A)<br>TS16 (TO A)<br>TS8 (TO DTMF RCV) | TS0 (FROM A)<br>TS16 (TO A)<br>TS8 RELEASED | CONVENTIONAL<br>CW TREATMENT |
| STATION B | TS1 (FROM B)<br>TS17 (TO B) | TS1 (FROM B)<br>TS17 (TO B) | TS1 (FROM B)<br>TS17 (TO B) | TS1 (FROM B)<br>TS17 (TO B) | CONVENTIONAL<br>CW TREATMENT |
| STATION C | | TS2 (FROM C)<br>TS18 (TO C)<br>(SILENCE TO C) | TS2 (FROM C)<br>TS18 (TO C)<br>(SILENCE TO C) | TS2 (FROM C)<br>TS18 (TO C)<br>(AUD RING TO C) | CONVENTIONAL<br>CW TREATMENT |
| SILENCE | | TS3 (TO C VIA<br>TS18) | TS3 (TO C VIA<br>TS18) | | |
| CALL-WAITING SIGNAL | | TS4 (TO A) OR<br>SWITCH NETWORK<br>TO A | | | CONVENTIONAL<br>CW TREATMENT |
| DTMF RECEIVER | | | TS6 OR<br>SWITCHING NETWORK<br>(TO DTMF RCV) | | |
| ATTENUATION | | | FROM A TO B TO<br>REDUCE ANNOYANCE | | |
| BUSY OR OTHER<br>TERMINATION TREATMENT | | | | | |
| AUDIBLE RING | | | | TS7 (TO C)<br>(AUD RING TO C) | CONVENTIONAL<br>CW TREATMENT |

ENHANCED CALL-WAITING SERVICE

FIELD OF THE INVENTION

This invention relates to custom calling telephone service and more particularly to the implementation of the call-waiting feature.

BACKGROUND OF THE INVENTION

When a customer who subscribes for call-waiting (hereinafter sometimes referred to as conventional call-waiting or CW) service is engaged in a telephone conversation with a second party and a third party calls that customer, the customer receives a special call-waiting signal while the third party receives audible ringing. If the call-waiting customer desires to receive the call from the third party, a switchhook flash will hold the second party while the subscriber's connection is switched to the third party. If the call-waiting signal is ignored, a second call-waiting signal is given after a few seconds.

Heretofore, call-waiting service has been illustrated in connection with both electromechanical and stored program controlled switching systems. Early versions of call-waiting service, such as that shown in Zarouni U.S. Pat. No. 3,133,995 required that auxiliary line terminals be provided for each line subscribing for call-waiting service. Later versions, such as those shown in Pommerening, et al. U.S. Pat. No. 3,963,874, George et al. U.S. Pat. No. 3,997,731, and R. V. Beth U.S. Pat. No. 3,584,156 either eliminated the need for a preassigned additional network line appearance or extended the call-waiting concept to program controlled switches in which certain custom calling features could be implemented by making changes in memory assignment.

As a further refinement of call-waiting service, Sheinbein U.S. Pat. No. 4,277,649 taught that, if the calling line's identity were forwarded to the switching office containing the called customer's service feature memory, that memory could be interrogated prior to completing the call to ascertain the call disposition based on the information that had been priorly inserted into the service feature memory by the called customer.

A variety of such control prior to the establishment of any telephone connection has enabled a customer subscribing for call-waiting service to cancel the call-waiting feature until later re-activated by the customer. This type of service has been known as "cancel call-waiting" or CCW service.

While each of the foregoing architectures implements a useful version of call-waiting service, telephone users continue to express some degree of dissatisfaction with the inflexible way in which call-waiting service operates.

When a call-waiting subscriber decides to ignore the call-waiting signal because the customer does not want to interrupt the conversation, not only must that customer experience the annoyance of the second or "reminder" call-waiting signal, but when that tone is subsequently ignored, the third party continues to receive audible ringing. Since the receipt of audible ringing is generally understood to be inconsistent with the called line being busy, the third party may be misled into believing that the called line is unattended. For this reason, the call-waiting customer who does not want to interrupt the existing connection may, nevertheless, want to indicate to the third party either that the line is truly busy or that the present conversation will be terminated in a short time. While pre-recorded announcements or rerouting have heretofore been available to treat third party calls prior to the establishment of the calling connection, the call-waiting subscriber has not heretofore been able selectively to direct the type of treatment to by given to the third party call during the continuance of his original conversation.

SUMMARY OF THE INVENTION

The foregoing problems are solved in accordance with my invention wherein I enable the customer subscribing for the enhanced type of call-waiting service (hereinafter sometimes referred to as the first party or "CWD" customer) and who has a dual tone multi-frequency telephone set (hereinafter DTMF telephone set), to dial a predetermined digit or digits in response to the receipt of a call-waiting signal or to flash the switchhook in response to the call-waiting signal. If the CWD customer flashes the switchhook, conventional call-waiting service will ensue in which the customer will be connected to the third party trying to reach him. On the other hand, if the CWD customer does not desire to receive the call from the third party but wishes to continue his conversation with the second party, the CWD customer can dial any of a plurality of predetermined DTMF digits within a short interval of time that will selectively either return a busy signal to the third party, cause a predetermined announcement to be given to the third party, or cause third party's call to be routed to a different termination. Subsequent incoming calls to the CWD customer will advantageously receive similar treatment for the duration of the conversation with the second party. In accordance with one aspect of my invention, a predetermined, short interval of time, illustratively two seconds, is allotted when a third party call is detected within which a register is assigned to the CWD customer without returning dial tone. During the short interval the CWD customer may either dial a predetermined DTMF digit, or ignore the capability and eventually switchhook flash or not, as in conventional call-waiting. Further, during this same predetermined short interval, insertion loss could temporarily be switched into the path toward the second party to attenuate the level of DTMF signal that is permitted to reach that party if the CWD customer does, in fact, dial a DTMF digit. Finally, if the CWD customer ignores the first call-waiting signal, a second call-waiting signal will be provided in the conventional manner.

During the short interval, while the CWD customer receives the call-waiting signal, audible ring back or any other termination treatment is delayed to the third party until the expiration of the aforementioned predetermined short interval. At the end of the short interval, the appropriate termination treatment will be accorded to the third party if the CWD customer has either dialed one of the predetermined digits or declined the opportunity. Audible ring back will be returned to the third party if no action was taken or a not-allowed DTMF digit was dialed, and the remainder of the call will be handled in the usual manner for the conventional call-waiting process.

BRIEF DESCRIPTION OF THE DRAWING

The foregoing and other objectives and features of my invention will become more apparent from the ensuing description when read together with the drawing, in which:

FIG. 1 is a flow chart of the process for distinguishing between the conventional and the enhanced method of supplying call-waiting service of my invention;

FIG. 2 is a flow chart describing the response to the keying of a DTMF digit;

FIG. 3 shows the connections to the receive bus and to the transmit bus of a conventional digital switching system that may be employed in the implementation of my invention;

FIG. 4 is a table showing the events transpiring when the CWD customer keys predetermined ones of the DTMF digits buttons; and FIG. 5 is a table showing the events transpiring if none of the DTMF buttons is keyed.

DETAILED DESCRIPTION

Referring now to FIG. 1, it is assumed that steps 101, 102, 103, 104 and 106 are part of the prior art, conventional call-waiting process in which the customer subscribing for call-waiting service is at station A. The process begins at step 101 with station A connected with a second party at station B. At step 102, a third party at station C initiates a call to station A. Decision step 103 is executed to determine whether station A is entitled to receive conventional call-waiting service. If customer A does not subscribe for call-waiting service, busy tone is immediately connected to the third party station C in step 104. Thus far, all of the processing of a call has been handled in a conventional, prior art manner by the call control logic of the central switching system (not shown) but which may be either the central control for an analog system such as the 1/1AESS system manufactured by AT&T-Technologies or others, or the central control for a digital switching system such as the DMS-100 system manufactured by Northern Telecom Inc. or the 5ESS system manufactured by AT&T Technologies, or others.

In accordance with my invention, however, an additional decision processing is undertaken beginning with step 105 to determine whether customer A has subscribed for enhanced call-waiting service, "CWD". If the customer has not subscribed for CWD service the conventional call-waiting process is entered at step 106. In prior art process 106 a time slot is allocated to the third party C in digital systems, or a three port circuit (not shown) is connected in analog systems. Thereafter, the call-waiting signal is delivered to A, audible ringing is delivered to C, and the system waits to detect the proper appearance of a switchhook flash by station A. If station A flashes, station A is connected to third party station C while station B is placed on hold, the remainder of the conventional call-waiting process, not being necessary to an understanding of the present invention, will not be described.

Assuming that decision step 105 determines that customer A has, indeed, subscribed for CWD service, another decision step 107 is made to determine if the CWD subscriber has already activated the CWD feature during the current conversation by checking if a flag CWDX is set. The CWDX flag is set to the state corresponding to the one of the permitted DTMF digits, "#", "*" or "0" which the customer might have previously keyed during the current conversation. In the illustrative process the digits "#", "*" and "0" have been selected for purposes of detailed explanation. It should be appreciated that other digits may be used with equally advantageous results. If no DTMF digit has been keyed, the call-waiting process 108 is executed.

Briefly, as shown in FIG. 1, process 108 continues the allocation of time slots for stations A and B but, in addition allocates time slots to station C, and to a DTMF receiver for a short interval of time. During this interval of time, a call-waiting signal is delivered to station A, audible ring back is not immediately furnished to station C but is delayed and, instead, station C is kept "high and dry" by connecting silence, and insertion loss is inserted in the path to station B.

If, however, decision step 107 determines that the CWDX flag is set, decision steps 109, 111, 113 are taken to determine which DTMF digit has been keyed. If the CWD customer keyed the digit "#", step 120 is executed by going to step 205 via entry point 220 of FIG. 2. If the CWD customer keyed the digit "*", step 122 is executed by going to step 207 via entry point 222 of FIG. 2. If the CWD customer keyed the digit "0", step 124 is executed by going to step 209 via entry point 224 of FIG. 2. If the CWD customer keyed any other permitted or non-permitted digit step 125 is executed by going to step 211 via entry point 225 of FIG. 2.

Referring now to FIG. 2, the process for responding to the DTMF digit that may be dialed by the enhanced call-waiting customer is detailed. At the top of FIG. 2, decision step 201 is executed during the short time interval referred to process 108. If station A does not transmit a DTMF signal within the short interval, step 202 is executed in which the insertion loss that had been added in the path to station B is removed and the remainder of the conventional call-waiting process described in step 106 of FIG. 1 is executed.

If step 201 detects the keying of a DTMF signal, step 203 removes the loss in the path to station B and decision step 204 is executed. Step 204 determines whether the predetermined digit "#" has been transmitted by enhanced call-waiting customer. If the "#" digit was keyed, step 204 causes step 205 to be executed in which busy tone is connected to station C. Step 215 sets the CWDX flag to CWD# for the duration of the call. This insures the same treatment to all subsequent calls to the CWD customer during the current call. Step 206 is executed to determine if the enhanced call-waiting customer keyed the predetermined "*" digit in which case step 207 is executed to connect a recorded announcement to station C. Step 217 sets the CWDX flag to CWD* for the duration of the call. This insures the same treatment to all subsequent calls to the CWD customer during the current call. Step 208 is executed to determine if the predetermined digit "0" was keyed by the enhanced call-waiting customer, if so step 209 is executed to connection station C to an alternate station instead of to an announcement. Step 219 sets the CWDX flag to CWD0 for the duration of the call. This insures the same treatment to all subsequent calls to the CWD customer during the current call. In step 210, a determination is made if none of the digits "#", "*", or "0" are transmitted to determine if the digit that was transmitted is a permitted digit.

If the digit detected is a permitted digit, a connection is established in step 211 as determined by the information stored in a translation table (not shown) in the central control of the telephone switching system. Step 221 sets the CWDX flag to CWD- for the duration of the call. This insures the same treatment to all subsequent calls to the CWD customer during the current call. If a non-permitted digit is detected in step 210, the call is permitted to continue in step 212 as in the conventional prior art call-waiting process.

In FIG. 3 a digital switching system including a network 300 controlled by CPU 301 and its associated memory store 307 are shown together with the transmit and receive buses of the network. Line module 302 serving local stations A and D, trunk module 304 serving remote stations B and C via the external telephone network (not shown), and service module 305 have access to the transmit and receive buses of network 300 via time slots "TS." assigned under the control of CPU 301. Service module 305 contains a silence circuit, a call-waiting signal source, a DTMF receiver, an audible ring source, a busy tone source, and a recorded announcement circuit. In a system such as the DMS-100, network 300 is contained in a network module unit while in a system such as the 5ESS network 300 is contained in a time slot interchanger TSI or a time-multiplexed switch, TMS. Network 300, accordingly, is illustrative of any type of digital switching system.

For illustrative purposes in facilitating the understanding of the invention, FIG. 3 shows certain time slots and control slots as having been assigned to the different appearances of the line, trunk, and service modules on the transmit and receive buses.

For example, station A belonging to the CWD customer in line module unit 302 has been assigned time slot TS0 for access to the transmit bus and time slot TS16 for access from the receive bus during the continuance of the stable call with station B. During time slot TS0, speech samples from the CWD customer are applied to the transmit bus. These samples are delivered, after switching through network 300 and the receive bus to station B via the trunk module 304, during time slot TS17. During time slot TS1 speech samples from station B are applied to the transmit bus and these samples are delivered via network 300 and the receive bus to station A during time slot TS16. In this manner, a stable telephone connection is in existence between stations A and B. This state is tabulated in column E1 of FIG. 4. Subsequent events will now be described with reference to both FIGS. 3, and 4 or 5.

Now let us consider the events in column E2 of FIG. 4. Stations A and B are assumed to continue in a stable call state but now a connection from station C, which has dialed the number of station A, is assumed to have reached the switching system of FIG. 3 via trunk module unit 304. CPU 301 of the switching system of FIG. 3 consults memory store 307 to determine if station A has conventional call-waiting service (step 103 of FIG. 1) or CWD service (step 105 of FIG. 1). Assuming memory store 307 indicates that station A is entitled to CWD service, CPU 301 allocates time slots TS2 and TS18 in network 300 to station C. As tabulated in column E2 of FIG. 4 and shown in FIG. 3, silence circuit of service module 305 is connected to the transmit bus during time slot TS3. CPU 301 maintains station C in the "high and dry" state by assigning time slot TS18 to deliver "silence" to station C via the receive bus. The call-waiting signal of service module 305 is connected to the transmit bus during time slot TS4 and network 300 delivers the call-waiting signal to station A during time slot TS16 via the receive bus.

Referring again to FIG. 4, the events transpiring during the "short interval" tabulated in column E3 will now be described. During this short interval, illustratively two seconds, station A may respond to the call-waiting signal by dialing a predetermined DTMF digit. Station A is now connected to the transmit bus both during time slot TS8 and time slot TS0. Any voice or DTMF signal from station A will be given to the transmit bus both during time slots TS0 and TS8. During time slot TS17 the signal will be delivered to station B and during time slot TS6 the signal will be delivered to the DTMF receiver of service module 305.

Thus far only speech time slots have been discussed. In addition to the "TS" time slots for conveying signals among the stations and service circuits, a number of "CT" or control time slots are provided to enable CPU 301 to communicate control information to network 300 and to enable network 300 to communicate control information to the line, trunk, and service modules. For present purposes only two of these control time slots are utilized. Assuming that the encoding of speech samples from the stations served by line module 302 is performed by encoder 303, the switching-in of attenuation loss called for in column E3 of FIG. 4 is accomplished by CPU 301 issuing an attenuation control command to network 300 during control time slot CT0 and by network 300 delivering the command to encoder 303 of line module 302 during control time slot CT1. In response to this command encoder 303 reduces the digital number representing any signals transmitted by station A to station B during TS0. The reduction does not, however, occur during TS8 when a connection is made to the DTMF receiver of service module 305.

At the conclusion of the predetermined short interval column E4 of FIG. 4 tabulates the events which take place for the case where the CWD customer at station A has dialed a predetermined DTMF digit indicating that a busy signal should be sent to station C. Time slot TS9 is allocated so that busy tone can be applied from the busy tone source of service module 305 to the transmit bus. Busy tone is delivered to station C via network 300 and the receive bus during time slot TS18.

On the other hand, as shown in FIG. 3, time slot TS9 may be assigned to service module 305 to render an alternative type of terminating treatment to station C, such as connection to a recorded announcement. Alternatively, CPU 301 may control the assignment of time slots TS2, TS18, TS10, and TS26 for call forwarding to another station such as station D associated with line module 302 using conventional preassigned call forwarding, busy-line procedures.

Column E5 and E6 of FIG. 4 tabulate the events ensuing following the administration of the appropriate type of terminating treatment to station C. In column E5 stations A and B continue their call, while station C, responding to the busy signal, for example, goes on-hook. In column E6 the end of the call is delineated.

Referring to FIG. 5, columns E1 and E2 tabulate situations similar to those of columns E1 and E2 of FIG. 4. In column E7 it is assumed, however, that station A has ignored the opportunity of dialing any digit during the predetermined short interval. Column E8 then tabulates the assignment of time slot TS7 from the audible ring circuit of service module 305 to transmit bus and the delivery of audible ring to station C during time slot TS18. Since station A is assumed not to have availed itself of the opportunity to control the call-waiting process, column E9 of FIG. 5 delineates the furnishing of conventional call-waiting treatment to stations A, B and C.

What is claimed is:

1. A method of controlling a switching machine to provide customer-controllable call-waiting to predetermined stations served by said machine, comprising the steps of:

(a) storing in a memory unit of said machine a respective indication for each station which is to be accorded control of call-waiting process, (b) determining, responsive to the detection of a third party call made during the continuance of a connection between two stations, whether said memory unit has said indication stored for the called one of said station, (c) assigning to said called station having said stored indication a dual tone multifrequency register for receiving digits from said called station during a predetermined short interval following said detection, loading said register responsive to the receipt of said dual-tone multifrequency signals, and (d) responding to said register to control the disposition of said third party call.

2. In a process for controlling call completion in which a first and a second alerting signal are sent to a busy station upon the detection of a third party call to said busy station, the improvement comprising the steps of:

(a) assigning a dual tone multifrequency register for use by said busy station during the interval between said first and second alerting signal, (b) modifying the completion of said third party call in accordance with the signals received by said register from said busy station, and (c) cancelling said second alerting signal in the event that said signals are received by said register.

3. In the process of claim 2, the further step of cancelling both said first and second alerting signal upon the detection of a subsequent third party call to said busy station.

4. In the process of claim 2, wherein said busy station is connected to a second station, the further step, performed incident to the assigning of said register, of inserting signaling loss in the path between said busy station and said second station.

5. In the process of claim 4, wherein said register is connected to said busy station for a predetermined interval and wherein busy signal to said third party is delayed at the time of said detection, the step of further delaying the return of busy signal to said third party until said signals have been received by said register or said predetermined interval has expired.

6. In the process of claim 3, the steps of:

(a) selectively setting a flag in accordance with the signals received by said register during said first third-party call, and (b) completing any subsequent third party call made to said busy station in accordance with said selectively set flag.

* * * * *